United States Patent [19]

Bracke

[11] 4,153,763
[45] May 8, 1979

[54] PROCESS FOR PRODUCING EXPANDABLE BEADS OF VINYL AROMATIC POLYMER RESINS

[75] Inventor: William J. I. Bracke, Hamme, Belgium

[73] Assignee: Labofina S. A., Brussels, Belgium

[21] Appl. No.: 907,333

[22] Filed: May 18, 1978

[30] Foreign Application Priority Data

Sep. 22, 1977 [BE] Belgium .................. 0181097

[51] Int. Cl.² .................................. C08V 9/18
[52] U.S. Cl. ........................ 521/60; 521/56; 521/57; 521/88; 521/905; 521/911
[58] Field of Search .............. 521/57, 60, 56, 88

[56] References Cited

U.S. PATENT DOCUMENTS

| | | | |
|---|---|---|---|
| 3,389,097 | 6/1968 | Ingram et al. | 521/60 |
| 3,429,737 | 2/1969 | Marsden et al. | 521/57 |
| 3,520,833 | 7/1970 | Wright | 521/60 |
| 3,526,605 | 9/1970 | Ingram | 521/60 |
| 3,560,414 | 2/1971 | Miskel, Jr. et al. | 521/57 |
| 3,637,538 | 1/1972 | Heald | 521/57 |
| 3,789,028 | 1/1974 | Heiskel et al. | 521/57 |

FOREIGN PATENT DOCUMENTS 1174749 12/1969 United Kingdom .................. 521/60

*Primary Examiner*—Morton Foelak
*Attorney, Agent, or Firm*—M. Norwood Cheairs; Richard L. Schwaab

[57] ABSTRACT

Disclosed is a process for producing expandable beads of vinyl aromatic polymer resin which provide cellular materials having a smaller and more uniform cell size, comprising the steps of suspension polymerizing beads of the vinyl aromatic polymer resin, and impregnating the beads while in suspension with a liquid blowing agent in the presence of an emulsifier comprising a diethanolamide of a fatty acid containing from 12 to 20 carbon atoms, and having a hydrophilic-lipophilic balance lower than 15.

14 Claims, No Drawings

PROCESS FOR PRODUCING EXPANDABLE BEADS OF VINYL AROMATIC POLYMER RESINS

BACKGROUND OF THE INVENTION

The present invention relates to a process for producing expandable beads of vinyl aromatic polymer resins, and more particularly to a process for producing expandable beads of vinyl aromatic polymer resins, wherein the polymer beads are impregnated with a blowing agent in the presence of a surface-active agent or emulsifier.

Expandable beads of thermoplastic resins such as polystyrene are currently used for manufacturing cellular plastic materials. These expandable beads contain a blowing or expanding agent having a boiling point lower than the softening point of the resin. When heated, the resin is thereby expanded or foamed. Generally, the beads are pre-expanded and are then deposited into a mold which is heated, for instance by introducing steam under pressure in the filled and closed mold, to further expand the beads and cause the beads to fuse together. This method can be applied for the manufacture of foamed sheets which are suitable for use as insulating materials, as packing material for electronic devices, and for producing drinking cups, and the like.

It is also known that the expandable beads which are used for the manufacture of these products should have a substantially uniform size. Moreover, the foamed products have better properties when the cells within the beads have a uniform and small size. This uniformity of the cells within the beads depends on the method which has been used for the impregnation of the beads with the blowing agent.

In the manufacture of expandable beads, the beads of vinyl aromatic polymer resin are prepared by suspension polymerization and are then impregnated with a liquid blowing agent, generally a low molecular weight aliphatic hydrocarbon, such as pentane. Conventionally, the resin beads are impregnated by direct contact with the blowing agent, typically by injecting the blowing agent into the beads while in aqueous suspension. With conventional processes for producing expandable beads, however, a uniform dispersion of the blowing agent within the beads cannot be obtained. The blowing agent is mainly located in the skin of the beads and the expandable beads have, therefore, cells whose sizes are not uniform.

In order to remedy this problem, it has been proposed to add to the suspension a surface-active agent, for instance a polyoxyethylene compound with an HLB (hydrophilic-lipophilic balance) of at least 15, in order to promote a uniform dispersion of the blowing agent within the beads. This method is disclosed in British Pat. No. 1,174,749, which teaches that surface-active agents with an HLB lower than 15 are not suitable for producing expandable beads wherein the blowing agent is uniformly dispersed. However, the use of the surface-active agents suggested in this patent has been found to have an adverse effect on the stability of the suspension, resulting in expandable beads having inferior properties and uniformity in size.

SUMMARY OF THE INVENTION

Accordingly, it is an object of the present invention to provide an improved process for the production of expandable beads of vinyl aromatic polymer resins.

A further object of the present invention is the provision of a process for producing expandable beads having a smaller and more uniform cell size.

A particular object of the present invention is the provision of a process for producing expandable beads of vinyl aromatic polymer resins wherein the blowing agent is uniformly dispersed throughout the bead.

A specific object of the instant invention is the provision of a process for producing expandable beads of vinyl aromatic polymer resins wherein the polymer beads are impregnated with a blowing agent in the presence of a surface-active agent or emulsifier, which eliminates the detrimental effect on aqueous suspension stability characteristic of conventional processes of this type.

In accomplishing the foregoing and other objects, there has been provided in accordance with the present invention a process for the production of expandable beads of vinyl aromatic polymer resins, which yield formed products having smaller and more uniform cell size, comprising the steps of suspension polymerizing beads of the vinyl aromatic polymer resins, and impregnating the beads while in suspension with a liquid blowing agent in the presence of an emulsifier comprising a diethanolamide of a fatty acid containing from 12 to 20 carbon atoms and having a hydrophilic-lipophilic balance lower than 15. In contravention to the teachings of British Pat. No. 1,174,749, it has been found that use of the emulsifier of the present invention produces beads having the blowing agent uniformly dispersed throughout the beads. Moreover, with the use of the instant emulsifiers, the aqueous suspension remains stable and beads having a substantially uniform size are obtainable.

The process of the instant invention is suitable for use with any liquid blowing agent, well known to the art, which has a boiling point lower than the softening point of the vinyl aromatic polymer resin of the beads. Preferably, however, the blowing agent is an aliphatic hydrocarbon containing from 5 to 7 carbon atoms. Moreover, while the process of the present invention is highly advantageous for use in producing expandable beads of any of the vinyl aromatic polymer resins well known to the art, the instant process is particularly suitable for use in the production of expandable beads of styrene homopolymers and copolymers. Accordingly, in an additional embodiment of the instant invention, expandable beads of vinyl aromatic polymer resins, particularly styrene resins, having improved properties are also provided.

Other objects, features, and advantages of the instant invention will become apparent to the skilled artisan upon examination of the following detailed description of the present invention.

DETAILED DESCRIPTION OF THE PREFERRED EMBODIMENTS

The process of the present invention for producing expandable beads of vinyl aromatic polymer resins comprises impregnating resin beads prepared by aqueous suspension polymerization, with a liquid blowing agent in the presence of a fatty acid diethanolamide as emulsifier, the fatty acid containing from 12 to 20 carbon atoms and having an HLB lower than 15.

It has been found that by adding this emulsifier to an aqueous suspension containing the polymer beads, the blowing agent is uniformly dispersed within the beads. Moreover, this aqueous suspension remains stable and beads having a substantially uniform size are obtained.

The vinyl aromatic polymer resin utilized in the beads of the present invention is a polymer of a vinyl aromatic monomer, such as styrene, chlorostyrene, or alkylstyrene. The resin can also be a copolymer of these monomers or a copolymer of one of these monomers with another monomer, such as, for example acrylonitrile, methacrylonitrile, methylmethacrylate, or butadiene polymers, such as, polybutadiene or butadiene-styrene copolymers. Other suitable vinyl aromatic monomers and copolymers thereof are disclosed in U.S. Pat. No. 3,047,534, herein incorporated by reference. Particularly preferred for use in the instant invention are polymers and copolymers of styrene, and most preferably polystyrene.

The blowing agent may comprise and blowing agent well known to those skilled in the art, which has a boiling point lower than the softening point of the vinyl aromatic polymer resin. Preferably, however, the blowing agent is a low-molecular weight aliphatic hydrocarbon having generally from 5 to 7 carbon atoms which is liquid at room temperature, such as, for example, pentane, isopentane, mixtures thereof, or mixtures of these pentanes with a lower amount of another aliphatic hydrocarbon containing from 5 to 7 carbon atoms. In the preferred embodiment, the blowing agent preferably comprises pentane. The amount of blowing agent within the beads may vary between about 1 and 15 weight percent, in particular between about 4 and 10 weight percent, based on the weight of resin. The blowing agent may be incorporated into the beads during the suspension polymerization or at the end of the polymerization.

The emulsifier which is added to the aqueous suspension in accordance with the inventive concepts of the present invention is a diethanolamide of a saturated aliphatic acid containing from 12 to 20 carbon atoms, and having an HLB of less than 15, such as, for example, the diethanolamides of palmitic acid, lauric acid, or of the mixture of acids comprising palm oil. Lauric acid diethanolamide with an HLB of 2.5 is generally used in the process of this invention.

This emulsifier is used in an amount sufficient to promote the substantially uniform dispersion of the blowing agent throughout the beads. An amount varying between about 0.1 and 0.3 weight percent, in particular between about 0.15 and about 0.25 weight percent, based on the resin weight, is generally suitable to promote this dispersion of the blowing agent into the beads without detrimental effect on the suspension stability.

The beads of vinyl aromatic polymer resin may be produced by any suspension polymerization process well known to those skilled in the art. Suspension polymerization is well known to the art and need not be described in detail here. Conventionally however, the vinyl aromatic monomer, mixture of vinyl aromatic monomers, mixture of vinyl aromatic monomer with other copolymerizable monomers, or other polymerizable mixtures is suspended in aqueous solution by means of a suspending agent, such as an insoluble phosphate, together with a surface-active agent, such as sodium dodecylbenzenesulfonate, and other useful additives, such as lubricants, anti-oxidants, chain regulating agents, fire retardant agents, nucleating agents, dyes, etc. The aqueous suspension is then agitated to break the liquid monomer into small droplets and maintained as such over a several hour period of reaction at elevated temperatures, during which period the polymerized beads are formed in suspension. Conventionally, a polymerization catalyst, such as peroxy catalyst, is also added to the suspension to accelerate the rate of polymerization. Examples of suspension polymerization processes suitable for use in the instant invention are disclosed in U.S. Pat. Nos. 3,047,534; 3,428,712; 3,627,855; 3,660,534; 3,781,383; and, 3,786,115, herein incorporated by reference.

The present invention also contemplates that the vinyl aromatic monomer of polymerizable mixtures thereof may first be subjected to a prepolymerization step before being subjected to the suspension polymerization. Such a procedure is conventionally employed for the production of beads of copolymers of styrene and rubbery polymers and is described in detail in several of the aforementioned patents.

As has been mentioned supra, the blowing agent may be incorporated into the beads during polymerization or at the end thereof. Preferably, the fatty acid diethanolamide is first added to the aqueous suspension of beads. Thereafter the blowing agent is gradually added to the aqueous suspension, in order to avoid the formation of a separated layer of blowing agent and to insure the formation of beads having a high uniformity of cell size, over a period between about 1 to 4 hours, preferably 1 to 3 hours, at a temperature between about 85° and 120° C. The aqueous suspension is then maintained at this temperature for a period of time sufficient to incorporate the blowing agent into the beads and uniformly distribute it therethrough. The amount of time necessary for the incorporation depends on the specific temperature employed, the amount of blowing agent utilized, and the size of the beads. Typically, after adding the blowing agent to the aqueous suspension, the suspension is maintained at this temperature for a period between about ½ and 5 hours.

According to the preferred embodiment of the present invention, styrene is polymerized in an aqueous suspension containing a suspending agent and a surface-active agent, to form polystyrene beads having a diameter comprised between 0.4 and 2 mm. The polystyrene beads are kept in suspension at the end of the polymerization. A further amount of suspending agent and of surface-active agent may be added to improve the suspension stability during the incorporation of the blowing agent. This incorporation is carried out at a temperature varyng between 85° and 120° C., and which is preferably higher than the softening point of the resin. Advantageously, the blowing agent is gradually added to the aqueous suspension in order to avoid the formation of a separated layer of blowing agent, an agglomeration of resin beads, and the formation of expanded beads wherein the sizes of the cells are not uniform.

The period of time which is required for adding the blowing agent to the aqueous suspension of resin beads depends on many factors, more particularly, on the temperature, the amount of blowing agent to be incorporated, and the sizes of the resin beads. This time is generally comprised between about 1 and 4 hours, in particular, between 1 and 3 hours. The total incorporation time, which comprises the time required for adding the blowing agent to the suspension and the heating time, typically ½ to 5 hours, is comprised between about 1½ to 8 hours.

Before adding the blowing agent, the emulsifier according to the present invention having an HLB lower than 15 is added to the aqueous suspension.

Other usual additives, such as fire retardant agents, nucleating agents, dyeing agents may be incorporated into the beads in admixture with the blowing agent.

In order to more fully describe the present invention, the following examples are presented which are intended to be illustrative and not in any sense limitative of the invention.

EXAMPLE 1

Part A—Preparation of polystyrene beads

A 120 l. polymerization reaction was charged with 55.1 kg of styrene, 0.180 kg of benzoyl peroxide, 0.0265 kg of tert. butyl perbenzoate and 0.014 kg of a mixture of dicumyl peroxide (40%) and calcium carbonate (60%).

To this mixture was then added a suspending mixture, containing 40.67 kg of water, 0.0057 kg of calcium chloride, 0.325 kg of apatite and 0.00057 kg of sodium dodecylbenzene sulfonate.

The obtained aqueous suspension was stirred and gradually heated up to 90° C. After heating at 90° C. for 3 hours, the suspension was stablized by adding 0.325 kg of apatite, 0.1925 g of sodium dodecylbenzene sulfonate and 10.1 kg of water. After heating at 90° C. for 4 hours, 0.2025 g of sodium dodecylbenzene sulfonate were added.

The aqueous suspension was maintained at this temperature for 6 hours, at the end of which time the temperature was increased to 121° C. for 1 hour.

78% of the beads thus prepared had a size comprised between 0.6 and 1.2 mm. These beads were then screened to recover beads having a size comprised between 0.84 and 1.2 mm.

Part B—Preparation of expandable beads 150 kg of these beads (size: 0.84 to 1.2 mm) were suspended in an aqueous system comprising 150 kg of water, 0.015 kg of calcium chloride, 0.960 kg of apatite, 2.85 g of sodium dodecylbenzene sulfonate, 0.225 kg of hydroxyethyl cellulose, and 0.300 kg of lauric acid diethanolamide.

The aqueous suspension was stirred and heated to 115° C. Then, 11.25 kg of pentane were gradually added over a period of 1½ hours. After this addition, the temperature was maintained at 115° C. for 4 hours. The suspension was thereafter cooled, and the beads recovered therefrom.

The expandable beads contained 6.5% of pentane.

When the beads were expanded, the cells within the beads had a substantially uniform size comprised between 40 and 60 microns.

By way of comparison, the procedure described in Parts A and B was repeated, but without adding lauric acid diethanolamide to the suspension. The resulting beads exhibited a cell size which varied between 100 and 200 microns, and had a core which was hard.

EXAMPLE 2

The procedure described in Parts A and B of Example 1 was repeated, but wth the use of 0.300 kg of the diethanolamides of palm oil fatty acids, instead of the same amount of lauric acid diethanolamide.

The expandable beads contained 6.8 weight percent of pentane.

The size of the cells in the expanded beads was comprised between 40 and 80 microns.

While the present invention has now been described in terms of certain preferred embodiments, and exemplified with respect thereto, the skilled artisan will readily appreciate that various modifications, changes, omissions and substitutions may be made without departing from the spirit thereof. It is intended, therefore, that the present invention be limited solely by the scope of the following claims.

What is claimed is:

1. A process for producing expandable beads of vinyl aromatic polymer resins, comprising the steps of:
    (a) forming beads of said vinyl aromatic polymer resin by polymerization in an aqueous suspension; and,
    (b) impregnating said beads with a liquid blowing agent by contacting said beads while in aqueous suspension with said blowing agent in the presence of an amount of a diethanolamide of a fatty acid, containing from 12 to 20 carbon atoms and having a hydrophilic-lipophilic balance lower than 15, sufficient to uniformly disperse said blowing agent throughout said beads.

2. The process of claim 1, wherein said resin is selected from the group consisting of homopolymers of styrene, chlorostyrene, and alkylstyrene, copolymers thereof, and copolymers of styrene with acrylonitrile, methacrylonitrile, methylmethacrylate, and butadiene polymers and copolymers.

3. The process of claim 2, wherein said resin is polystyrene.

4. The process of claim 1, wherein said blowing agent is selected from the group consisting of aliphatic hydrocarbons containing from 5 to 7 carbon atoms, and mixtures thereof.

5. The process of claim 4, wherein said blowing agent is incorporated into said beads during the polymerization thereof.

6. The process of clam 4, wherein said blowing agent is incorporated into said beads at the end of the polymerization.

7. The process of claim 4, wherein said blowing agent is used in an amount between about 1 and 15% by weight, based on the weight of the resin.

8. The process of claim 7, wherein said blowing agent is used in an amount between about 4 and 10% by weight, based on the weight of the resin.

9. The process of claim 4, wherein said blowing agent is pentane.

10. The process of claim 1, wherein said fatty acid diethanolamide is selected from the group consisting of the diethanolamides of palmitic acid, lauric acid, or the mixture of fatty acids comprising palm oil.

11. The process of claim 10, wherein said fatty acid is used in an amount between about 0.1 and 0.3% by weight, relative to the weight of the resin.

12. The process of claim 11, wheren said fatty acid diethanolamide is used in an amount between about 0.15 and 0.25% by weight, relative to the weight of the resin.

13. The process of claim 10, wherein said fatty acid diethanolamide is lauric acid diethanolamide.

14. The process of claim 1, wherein said beads are impregnated with said blowing agent by first adding said fatty acid diethanolamide to said aqueous suspension of beads, thereafter gradually adding said blowing agent to said aqueous suspension over a period between about 1 and 4 hours at a temperature between about 85° and 120° C., and then maintaining said aqueous suspension at said temperature for a period between about ½ and 5 hours to incorporate and uniformly disperse said blowing agent throughout said beads.

* * * * *